(12) United States Patent
de Perthuis et al.

(10) Patent No.: US 11,102,000 B2
(45) Date of Patent: Aug. 24, 2021

(54) KEY DERIVATION SCHEME FOR DATA FRAME TRANSMISSION IN ULTRA-WIDE BAND RANGING IN KEYLESS ENTRY SYSTEMS

(71) Applicant: NXP B.V., Eindhoven (NL)

(72) Inventors: Hugues Jean Marie de Perthuis, Garcelles (FR); Frank Leong, Veldhoven (NL)

(73) Assignee: NXP B.V., Eindhoven (NL)

( * ) Notice: Subject to any disclaimer, the term of this patent is extended or adjusted under 35 U.S.C. 154(b) by 36 days.

(21) Appl. No.: 16/737,194

(22) Filed: Jan. 8, 2020

(65) Prior Publication Data

US 2020/0228331 A1     Jul. 16, 2020

(30) Foreign Application Priority Data

Jan. 10, 2019   (EP) .................................. 19290003

(51) Int. Cl.

| *H04L 9/16* | (2006.01) |
| *G01S 13/02* | (2006.01) |
| *H04L 9/06* | (2006.01) |
| *H04L 9/08* | (2006.01) |
| *H04L 9/32* | (2006.01) |
| *H04L 29/06* | (2006.01) |
| *H04W 12/0433* | (2021.01) |

(52) U.S. Cl.
CPC ............ *H04L 9/16* (2013.01); *G01S 13/0209* (2013.01); *H04L 9/0637* (2013.01); *H04L 9/0643* (2013.01); *H04L 9/0825* (2013.01); *H04L 9/0872* (2013.01); *H04L 9/3242* (2013.01); *H04L 63/0442* (2013.01); *H04L 63/0464* (2013.01); *H04W 12/0433* (2021.01); *H04L 2209/38* (2013.01)

(58) Field of Classification Search
None
See application file for complete search history.

(56) References Cited

U.S. PATENT DOCUMENTS

| 2017/0359134 A1 | 12/2017 | Baier et al. |
| 2018/0275268 A1 | 9/2018 | Reisinger et al. |
| 2019/0013937 A1 | 1/2019 | Leong et al. |
| 2020/0182996 A1* | 6/2020 | Lee ........................ G01S 5/0284 |

FOREIGN PATENT DOCUMENTS

| EP | 3370082 A1 * | 9/2018 | ............. G01S 11/02 |
| EP | 3425867 A1 | 1/2019 | |

OTHER PUBLICATIONS 802.15.4-2015 IEEE Standard for Low-Rate Wireless Networks; Clause 16 HRP UWB PHY (pp. 446-474); Apr. 22, 2016; DOI: 10.1109/IEEESTD.2016.7460875.

(Continued)

*Primary Examiner* — William J. Goodchild

(57) ABSTRACT

Disclosed are methods and devices for deriving keys for coding the contents of data frames, which are to be transmitted in a keyless entry system during an ultra-wide band ranging session between a transceiver device coupled to a base structure to be opened and closed and/or to be locked and unlocked, and a mobile transceiver device associated with the structure-coupled transceiver device.

13 Claims, 4 Drawing Sheets

(56) References Cited

OTHER PUBLICATIONS

Bellare, Mihir et al.; "The EAX Mode of Operation;" Jan. 18, 2004; Fast Software Encryption, Lecture Notes in Computer Science, vol. 3017, Springer, Berlin, Heidelberg 2004; January DOI https://doi.org/10.1007/978-3-540-25937-4_25.

Chen, Lily; NIST Special Publication 800-108; "Recommendation for Key Derivation Using Pseudorandom Functions (Revised Oct. 2009 with Original version published Nov. 2008);" Computer Security Division, Information Technology Laboratory; Oct. 2009.

Jiang, Yi, et al.; "An Asymmetric Double Sided Two-Way Ranging for Crystal Offset;" Published in 2007 International Symposium on Signals, Systems and Electronics; Date of Conference Jul. 30-Aug. 2, 2007; Montreal, QC, Canada; DOI: 10.1109/ISSSE.2007.4294528.

Poturalski, Marcin et al.; "Distance Bounding with IEEE 802.15.4a: Attacks and Countermeasures;" Published in IEEE Transactions on Wireless Communications, vol. 10 , No. 4 , Apr. 2011; Date of Publication: Feb. 17, 2011; DOI: 10.1109/TWC.2011.020111.101219.

Xing, Lee Jian et al.; "Symmetric Double Side Two Way Ranging with Unequal Reply Time;" Published in 2007 IEEE 66th Vehicular Technology Conference; Date of Conference: Sep. 30-Oct. 3, 2007, Baltimore, MD; DOI: 10.1109/VETECF.2007.416.

Zafer, Sahinoglu et al.; "Ranging in the IEEE 802.15.4a Standard;" Published in 2006 IEEE Annual Wireless and Microwave Technology Conference; Date of Conference: Dec. 4-5, 2006, Clearwater Beach, FL; DOI: 10.1109/WAMICON.2006.351897.

\* cited by examiner (State of the art)

(State of the art)

KEY DERIVATION SCHEME FOR DATA FRAME TRANSMISSION IN ULTRA-WIDE BAND RANGING IN KEYLESS ENTRY SYSTEMS

CROSS-REFERENCE TO RELATED APPLICATIONS

This application claims priority under 35 U.S.C. § 119 to European Patent Application No. 19290003.3, filed on Jan. 10, 2019, the contents of which are incorporated by reference herein.

TECHNICAL AREA

The present disclosure relates to methods and devices for deriving keys for coding the contents of data frames, which are to be transmitted in a keyless entry system during an ultra-wide band ranging session between a transceiver device coupled to a base structure to be opened and closed and/or to be locked and unlocked, and a mobile transceiver device associated with the structure-coupled transceiver device.

BACKGROUND ART

Modern comfort cars, which are currently on the market, may be equipped with a passive keyless entry (PKE) system. In such a PKE system, approaching a car with an associated tag (or key fob) is enough to unlock the car, as an example of a base structure to be opened and closed and/or to be locked and unlocked, without the need to press a button that may be provided on the tag.

In an attempt to provide secure car access in modern keyless entry systems—while not all systems available on the market are really secure—radio frequency (RF) ranging systems are used to protect against presently known attacks, such as the so-called relay attack, and/or in principle possible attacks, such as the so-called preamble injection attack and the theoretically known, but not yet found in the field, cicada attack, which are known to be possible in ultra-wide band (UWB) RF ranging systems.

An UWB RF ranging system typically employs the Time-of-Flight principle to determine the distance between the tag and the structure to be opened or markers on the structure. Usually, a transceiver's transmitter sends out a waveform, commonly a chirp or a pulse, which is either reflected by an object or retransmitted by a second transceiver. Based on the amount of time it takes for the reflection or retransmission to reach the originating transceiver's receiver, the distance between the objects can be calculated. The so determined range between the receiver and the transmitter is then used as a control point to enable access.

EP 3 255 851 A1 discloses a concept for protecting against replay of previously transmitted pulses, wherein each transmitted pulse is included (or provided with) a so-called Secure Training Sequence (STS), the content of which can be predicted only with the knowledge of some shared keys. The concept of STS can also be used in RF communication involving the transmission of data frames.

The concept of a "Secure Training Sequence" (STS) has been developed in the industry with participation of the Applicant under the stated denomination. This concept is meanwhile being considered, among others, by standardization organizations for the purposes of standardization, further refinements, and spreading of this technology. As such, this concept has become the subject of the IEEE 802.15.4z standard document under the denomination "Generic Scrambled Timestamp Sequence" (GSTS). The denomination "Secure Training Sequence" (STS) and the denomination "Generic Scrambled Timestamp Sequence" (GSTS) are used synonymously, or interchangeably, in this disclosure.

Moreover, in the communication between a tag and the associated base structure, for example between a key fob and the associated car, it is also required to protect the transfer of data. In particular, in RF ranging applications, where measurement pulses are sent in the form of data frames including a timestamp, it is desired to prevent timestamp manipulation at the end of a ranging session. This can be done by using so-called Type 2 data frames, which can be used to transfer timestamps in ranging measurements and other information, the length of which cannot be predicted.

To cope with the use of the two different types of data frames, i.e. Type 1 and Type 2 data frames, it is desirable to provide a key derivation scheme, which must allow achieving the following:

A receiver must be capable to receive an STS index and to check its authenticity and integrity.

In its transmission, the confidentiality of the STS index must be protected.

A receiver must be allowed to generate the STS, once the receiver is synchronized to STS index.

Transfer of payload must be allowed, wherein its confidentiality, authenticity and integrity are to be protected.

The privacy of a user must be protected by ensuring that no fingerprint, for example an incrementing counter, an address, etc., is/are transferred in the clear, i.e. unencrypted.

All these features should be supported with minimal overhead. Indeed, in ultra-wide band RF communication operations, every additional byte will decrease the RF budget. Therefore, in brief, the amount of transmitted data should be minimized.

SUMMARY OF THE DISCLOSURE

It is an object of the present disclosure to provide a key derivation scheme for, e.g. ultra-wide band, RF communication involving the use of data frames of a first type and data frames of a second type, for example the Type 1 and the Type 2 data frames mentioned above, in which the amount of transmitted data is reduced with respect to conventionally employed framing schemes and the protection of the privacy of a user and the confidentiality, integrity and authenticity of transmitted data is increased.

This object is solved by the subjects having the features according to the independent patent claims. Further embodiment examples are shown in the dependent claims.

According to an exemplary embodiment example of the present disclosure, there is established a method for encoding a data frame to be transmitted during a ranging session, in a keyless, e.g. ultra-wide band based, entry system comprising a transceiver device operatively coupled to a base structure to be opened and closed and/or to be locked and unlocked by the entry system and a mobile transceiver device provided to be approachable to the base structure, for example when being carried by a user approaching the base structure, and associated with the structure-coupled transceiver device, between the mobile transceiver device and the structure-coupled transceiver device. A ranging session comprises a first phase of initiating a ranging session, for example by operating the mobile transceiver device, a second phase of upgrading encryption keys, e.g. for establishing authenticity of the mobile transceiver device and confidentiality of data to be exchanged, and a third phase of performing ranging measurements and transmitting data frames, e.g. comprising payload data.

In this method, a data frame to be transmitted is a data frame of a first type or a data frame of a second type. A data frame of the first type has at least one synchronization portion, at least one first start frame delimiter, an authenticated Generic Scrambled Timestamp Sequence (GSTS) (or Secure Training Sequence (STS)), and a data portion, which comprises, as part of its ciphertext, a crypto-identifier used once. A data frame of the second type has a preamble and a data portion, wherein the preamble comprises a synchronization portion and a second start frame delimiter, and wherein the data portion comprises unpredictably variable data contents.

In this method, the method for encoding a data frame of the first type, in preparation of transmitting a particular data frame of the first type, has:

providing a Generic Scrambled Timestamp Sequence index (or synonymously: Secure Training Sequence index, or short: STS index) for the current data frame to be transmitted, providing an authentication key, which has been derived in the upgrading encryption keys phase of the ranging session, performing a cryptographically secure random number generation (CSPRNG) taking the Generic Scrambled Timestamp Sequence (GSTS) index (or: STS index) for the current data frame as its input and further using the derived authentication key as its key input parameter, so as to provide an authenticated Generic Scrambled Timestamp Sequence for the current data frame of the first type to be transmitted, and performing an electronic code book (ECB) encryption, or a Cipher Block Chaining (CBC) encryption, the encryption taking the Generic Scrambled Timestamp Sequence (GSTS) index (or: STS index) for the current data frame as its input and further using a privacy key, which has been derived in the initiating phase of the ranging session, as its key input parameter, so as to provide the crypto-identifier used once for the ciphertext of the data portion of the current data frame of the first type to be transmitted.

In this method, further, the method for encoding a data frame of the second type, in preparation of transmitting a particular current data frame of the second type, has:

providing payload data to be transmitted, providing the Generic Scrambled Timestamp Sequence (GSTS) index (or: STS index) also for the current data frame to be transmitted, providing a payload key, which has been derived in the upgrading encryption keys phase of the ranging session, and performing an authenticated encryption (AE) taking the payload data for the current data frame as its input and further using the Generic Scrambled Timestamp Sequence (GSTS) index (or: STS index) for the current data frame as its nonce input parameter and the derived payload key as its key input parameter, so as to provide authenticated encrypted payload data as the ciphertext of the data portion of the current data frame of the second type to be transmitted.

The expression "start frame delimiter" as used herein may refer to any generic type of start frame delimiter with the function/functionality as it is generally known in the art, and embraces in particular the "start-of-frame delimiter" as known from IEEE 802.15.4 as SFD.

The expression "Generic Scrambled Timestamp Sequence (GSTS)" or synonymously "Secure Training Sequence (STS)" is understood herein to refer to a pseudo-randomly modulated pulse sequence, which is known only to a paired set of transceivers, and which can be correlated and/or verified by the receiver upon reception, allowing to ensure that the transmitted signal has not been manipulated for the purpose of shortening the perceived/measured time-of-flight distance between the set of transceivers. The modulation sequence, which needs to be unpredictable for any potential attacker, can be generated by e.g. a Deterministic Random Bit Generator (DRBG), as described in https://mentor.ieee-.org/802.15/dcn/18/15-18-0107-01-004z-secure-rf-rang-ing.pptx. The GSTS, or STS, is defined as a frame/packet field, which is added to a frame/packet containing other fields, such as a preamble and optionally also regular payload data.

As described in US 2018/0275268 A1, using the concept of the STS for protecting RF communication against attacks entails the transfer of an STS index, which is also referred to herein as a crypto identifier or "crypto ID". The STS index (or crypto ID) should be incremented upon each single use, for example each data frame transfer, at a given rate, and could therefore also be used for the purpose of synchronization between the tag (or a transceiver in the tag) and the base structure, such as a car (or a transceiver in the base structure).

As is further described in US 2018/0275268 A1, an STS index must be transmitted to allow a receiver to synchronize on the transmitter and to correctly predict the STS of the next frames. This can be done by transmitting so-called Type 1 data frames, which comprise a secure preamble including a synchronization header and a STS, and payload data including the current value of the STS index. In addition to transmitting STS and Crypto ID, Type 1 data frames can also be used for secure ranging, which is done by using (only) the STS field.

The integrity and authenticity of this STS index must be protected to prevent reuse by an attacker. The confidentiality of the STS index needs to be protected to avoid privacy of user to be compromised by fingerprinting the STS index, which he/she uses.

According to a further exemplary embodiment example of the present disclosure, there is established a method for encoding a data frame to be transmitted between the mobile transceiver device and the structure-coupled transceiver device during a ranging session, in a keyless, in particular ultra-wide band based, entry system comprising a transceiver device operatively coupled to a base structure to be opened and closed and/or to be locked and unlocked by the entry system and a mobile transceiver device provided to be approachable to the base structure, for example when being carried by a user approaching the base structure, and associated with the structure-coupled transceiver device. A ranging session comprises a first phase of initiating a ranging session, for example by operating the mobile transceiver device, a second phase of upgrading encryption keys, e.g. for establishing authenticity of the mobile transceiver device and confidentiality of data to be exchanged, and a third phase of performing ranging measurements and transmitting data frames, e.g. comprising payload data.

In this method, a data frame to be transmitted is a data frame of a first type, e.g. a Type 1 data frame as mentioned above, having at least one synchronization portion, at least one first start frame delimiter, an authenticated Generic Scrambled Timestamp Sequence (GSTS) (or Secure Training Sequence (STS)), and a data portion, which comprises, as part of its ciphertext, a crypto-identifier used once.

In this method, the method for encoding a data frame of the first type, in preparation of transmitting a particular data frame of the first type, has:
  providing a Generic Scrambled Timestamp Sequence index (or: STS index) for the current data frame to be transmitted,
  providing an authentication key, which has been derived in the upgrading encryption keys phase of the ranging session,
  performing a cryptographically secure random number generation (CSPRNG) taking the Generic Scrambled Timestamp Sequence index (or: STS index) for the current data frame as its input and further using the derived authentication key as its key input parameter, so as to provide an authenticated Generic Scrambled Timestamp Sequence for the current data frame of the first type to be transmitted, and
  performing an electronic code book (ECB) encryption, or a Cipher Block Chaining (CBC) encryption, the encryption taking the Generic Scrambled Timestamp Sequence index (or: STS index) for the current data frame as its input and further using a privacy key, which has been derived in the initiating phase of the ranging session, as its key input parameter, so as to provide the crypto-identifier used once for the ciphertext of the data portion of the current data frame of the first type to be transmitted.

In an embodiment of the method according to the exemplary embodiment examples disclosed above, a data frame of the first type may be implemented as a "compact" frame of the first type, which is implemented according to one of the following embodiments:
  i) the data frame of the first type has, in the stated sequence, a secured preamble comprising a synchronization portion, a first start frame delimiter, the authenticated Generic Scrambled Timestamp Sequence, and the data portion, which comprises, as part of its ciphertext, the crypto-identifier used once;
  ii) the data frame of the first type has, in the stated sequence, a secured preamble comprising a synchronization portion, a first start frame delimiter, the data portion, which comprises, as part of its ciphertext, the crypto-identifier used once, and the authenticated Generic Scrambled Timestamp Sequence.

Alternatively, in another embodiment of the method according to the exemplary embodiment examples disclosed above, a data frame of the first type may be implemented as a "Superframe" of the first type, which is implemented according to one of the following embodiments:
  iii) the data frame of the first type is composed of a first portion and a second portion, wherein the first portion comprises a synchronization portion, a first start frame delimiter, and the data portion, which comprises, as part of its ciphertext, a crypto-identifier used once, wherein the second portion comprises a synchronization portion, a first start frame delimiter, and the authenticated Generic Scrambled Timestamp Sequence, and wherein the second portion is delayed with respect to the first portion by a separation time period;
  iv) the data frame of the first type is composed of a first portion and a second portion, wherein the first portion comprises a synchronization portion, a first start frame delimiter, and the authenticated Generic Scrambled Timestamp Sequence, wherein the second portion comprises a synchronization portion, a first start frame delimiter, and the data portion, which comprises, as part of its ciphertext, a crypto-identifier used once, and wherein the second portion is delayed with respect to the first portion by a separation time period.

In an embodiment of the method according to the exemplary embodiment examples disclosed above, the authentication key derived in the upgrading encryption keys phase of the ranging session has been obtained by applying a third key derivation function (third KDF) to a data protection key, which is used for the third key derivation function as its input, and which has been derived in initiating phase of the ranging phase, and which further uses a configuration information for the ultra-wide band channel, which has been established in the initiating phase of the ranging session, as its first derivation data input, and a Generic Scrambled Timestamp Sequence for a key update frame, which has been provided in the upgrading encryption keys phase of the ranging session, as its second derivation data input.

In an embodiment of the method according to the exemplary embodiment examples disclosed above, the payload key derived in the upgrading encryption keys phase of the ranging session has been obtained by applying a fourth key derivation function (fourth KDF) to a data protection key, which is used for the fourth key derivation function as its input, and which has been derived in the initiating phase of the ranging phase, and which further uses a configuration information for the ultra-wide band channel, which has been established in the initiating phase of the ranging session, as its first derivation data input, and a Generic Scrambled Timestamp Sequence for a key update frame, which has been provided in the upgrading encryption keys phase of the ranging session, as its second derivation data input.

In an embodiment of the method according to the exemplary embodiment examples disclosed above, the data protection key derived in the initiating phase of the ranging session has been obtained by applying a second key derivation function (second KDF) to a session key, which has been provided in the initiating phase of the ranging session. In an embodiment, the second key derivation function may have a static derivation input.

In an embodiment of the method according to the exemplary embodiment examples disclosed above, the privacy key derived in the initiating phase of the ranging session has been obtained by applying a first key derivation function (first KDF) to a session key, which has been provided in the initiating phase of the ranging session. In an embodiment, the first key derivation function may have a static derivation input.

In an embodiment of the according to the exemplary embodiment examples disclosed above, the authenticated Generic Scrambled Timestamp Sequence index (or: STS index) may be a seed for a crypo-identifier used once.

In an embodiment of the method according to the exemplary embodiment examples disclosed above, the data frames to be transmitted are sent from the mobile transceiver device as a transmitting device to the structure-coupled transceiver device as a receiving device, or, alternatively, the data frames to be transmitted are sent from the structure-coupled transceiver device as a transmitting device to the mobile transceiver device as a receiving device.

In an embodiment of the method according to the exemplary embodiment examples disclosed above, the mobile transceiver device is incorporated in a key fob device.

In an embodiment of the method according to the exemplary embodiment examples disclosed above, the mobile transceiver device is incorporated in a mobile phone device.

The mobile phone device may be capable to run multiple ranging sessions with multiple associated base structures, in particular cars, at a time. Alternatively or in addition, the base structure, in particular a car, may be capable to run multiple ranging sessions with multiple associated mobile phone devices at a time.

In an embodiment of the method according to the exemplary embodiment examples disclosed above, the data portion of the data frame to be transmitted comprises ciphertext of ancillary data, for example a source address of the transmitting device and a destination address of the receiving device, for example to an amount of 32 bits.

In an embodiment of the method according to the exemplary embodiment examples disclosed above, the data portion further comprises padding bits, which are used as an authenticity tag, for example 0x00..00, for example to an amount, which results in the data portion having the size of a cipher block, i.e. 128 bits.

According to a still further exemplary embodiment example of the present disclosure, a method for encoding a data frame to be transmitted between the mobile transceiver device and the structure-coupled transceiver device during a ranging session, in a keyless, in particular ultra-wide band based, entry system comprising a transceiver device operatively coupled to a base structure to be opened and closed and/or to be locked and unlocked by the entry system and a mobile transceiver device provided to be approachable to the base structure, for example when being carried by a user approaching the structure, and associated with the structure-coupled transceiver device. A ranging session comprises a first phase of initiating a ranging session, for example by operating the mobile transceiver device, a second phase of upgrading encryption keys, e.g. for establishing authenticity of the mobile transceiver device and confidentiality of data to be exchanged, and a third phase of performing ranging measurements and transmitting data frames, e.g. comprising payload data.

In this method, a data frame to be transmitted is a data frame of a second type, e.g. a Type 2 data frame mentioned above, having a preamble and a data portion, wherein the preamble comprises a synchronization portion and a second start frame delimiter, and wherein the data portion comprises unpredictably variable data contents.

In this method, the method for encoding a data frame of the second type, in preparation of transmitting a particular current data frame of the second type, has:
  providing payload data to be transmitted,
  providing a Generic Scrambled Timestamp Sequence (GSTS) index (or synonymously: Secure Training Sequence index, or short: STS index) for the current data frame to be transmitted,
  providing a payload key, which has been derived in the upgrading encryption keys phase of the ranging session, and
  performing an authenticated encryption taking the payload data for the current data frame as its input and further using the Generic Scrambled Timestamp Sequence (GSTS) index (or: STS index) for the current data frame as its nonce input parameter and the derived payload key as its key input parameter, so as to provide authenticated encrypted payload data as a ciphertext of the data portion of the current data frame of the second type to be transmitted.

In an embodiment of the method according to the said still further exemplary embodiment example, the authenticated encryption is implemented as one of: AES-CBC with a CBC-MAC, AES-CCM, AES-GCM, or AES-EAX. Herein, AES is the acronym for Advanced Encryption Standard, CBC is the acronym for Cipher Block Chaining, MAC is the acronym for Message Authentication Code, CCM is the acronym for Counter with CBC-MAC, GCM is the acronym for Galois/Counter Mode, and EAX is a further block cipher mode of operation. References to these are given further below.

In an embodiment of the method according to the said still further exemplary embodiment example, the keyless entry system is an ultra-wide band based keyless entry system.

In embodiments of the methods according to the exemplary embodiment examples disclosed above, the keyless entry system is an ultra-wide band based keyless entry system.

According to yet another exemplary embodiment example of the present disclosure, there is provided a mobile transceiver device or a structure-coupled transceiver device, wherein each one of the transceiver devices is configured to implement the method according to any one of the first, second or third exemplary embodiment example of the present disclosure disclosed above.

In an embodiment of the transceiver device, there is provided a mobile transceiver device or a structure-coupled transceiver device, wherein each one of the transceiver devices is implemented in an integrated circuit.

According to yet another exemplary embodiment example of the present disclosure, there is provided a machine-readable storage medium storing a software program for controlling or executing the method according to any one of the first, second or third exemplary embodiment example of the present disclosure disclosed above, when run on a data processing system, such as a processor, a microprocessor, or a computer.

Encryption and Calculation Standards Involved in the Above Encoding Methods

The methods disclosed above according to the first, second and third exemplary embodiment example of the present disclosure involve encryption and calculation standards, which are generally known to a skilled person, and to which references are provided in the following.

The methods disclosed above according to the first and the second exemplary embodiment examples of the present disclosure involve the use of cryptographically secure pseudo-random number generation (CSPRNG). Such techniques are well known to the skilled person, and are described for example in a document issued by the US National Institute of Standards and Technology (NIST), viz. NIST Special Publication 800-90A, Revision 1, entitled "Recommendation for Random Number Generation Using Deterministic Random Bit Generators", June 2015.

The methods disclosed above according to the first and the second exemplary embodiment examples of the present disclosure further involve the use of electronic code book (ECB) encryption, or of Cipher Block Chaining (CBC) encryption. ECB encryption and CBC encryption belong to the earliest so-called block cipher modes of operation, which were first announced as a standard in a document issued by the US National Institute of Standards and Technology (NIST) referenced as Federal Information Processing and Standards Publications FIPS PUB 81, entitled "DES Modes Of Operation", 2 Dec. 1980.

ECB is the simplest one of the encryption modes, and as such can be implemented most time-efficiently. The message to be encrypted is divided into blocks, and each block is encrypted separately.

CBC has been the most commonly used mode of operation. Each block of plaintext to be encrypted is XORed with the previous ciphertext block before being encrypted. In this way, each ciphertext block depends on all plaintext blocks processed up to that point. To make each message unique, an initialization vector must be provided for XORing with the first plaintext block. Main drawbacks of CBC are that encryption is sequential, i.e. it cannot be parallelized, and that the message must be padded to a multiple of the cipher block size.

In 2001, NIST revised its list of approved modes of operation by including the Advanced Encryption Standard (AES) as a block cipher and adding CTR mode in the document NIST Special Publication 800-38A, entitled "Recommendation for Block Cipher Modes of Operation—Methods and Techniques", December 2001.

The method disclosed above according to the third exemplary embodiment example of the present disclosure involves an authenticated encryption, which is, in embodiments, implemented as one of: AES-CBC with a CBC-MAC, AES-CCM, AES-GCM, or AES-EAX. These are block cipher modes of operation, which are generally known to the skilled person.

As mentioned already, AES is the acronym for Advanced Encryption Standard, CBC is the acronym for Block Cipher Chaining, MAC is the acronym for Message Authentication Code, CCM is the acronym for Counter with CBC-MAC. These modes of operation are described in NIST Special Publication 800-38A mentioned above.

GCM is the acronym for Galois/Counter Mode. NIST announced the release of NIST Special Publication 800-38D, entitled "Recommendation for Block Cipher Modes of Operation: Galois/Counter Mode (GCM) and GMAC", November 2007, which made GCM an official standard mode of operation, and also GMAC an official standard. GCM is ideal for protecting packetized data because it has minimum latency and minimum operation overhead.

EAX is another block cipher mode of operation, which is first disclosed in M. Bellare, P. Rogaway, D. Wagner, "The EAX Mode of Operation—A Two-Pass Authenticated-Encryption Scheme Optimized for Simplicity and Efficiency", *Fast Software Encryption* '04, Lecture Notes in Computer Science, R. Bimal and W. Meier ed., Springer-Verlag, 2004.

The methods disclosed above according to the first, second and third exemplary embodiment examples of the present disclosure further involve Key Derivation Functions (KDFs). A KDF is a technique for modifying, upgrading or further encrypting a key, which is provided as an input to the KDF, so as to provide a modified, upgraded or further encrypted key at the output of the KDF. Such techniques are also well known to the skilled person, and are described for example in a document issued by NIST, viz. NIST Special Publication 800-10A (Revised), entitled "Recommendation for Key Derivation Using Pseudorandom Functions", October 2009.

BRIEF DESCRIPTION OF THE DRAWINGS

In the following, exemplary embodiment examples of the present disclosure are described in detail with reference to the following drawings.

Similar or like components in different figures are provided with the same reference numerals.

DETAILED DESCRIPTION OF EMBODIMENTS

Figure 1:
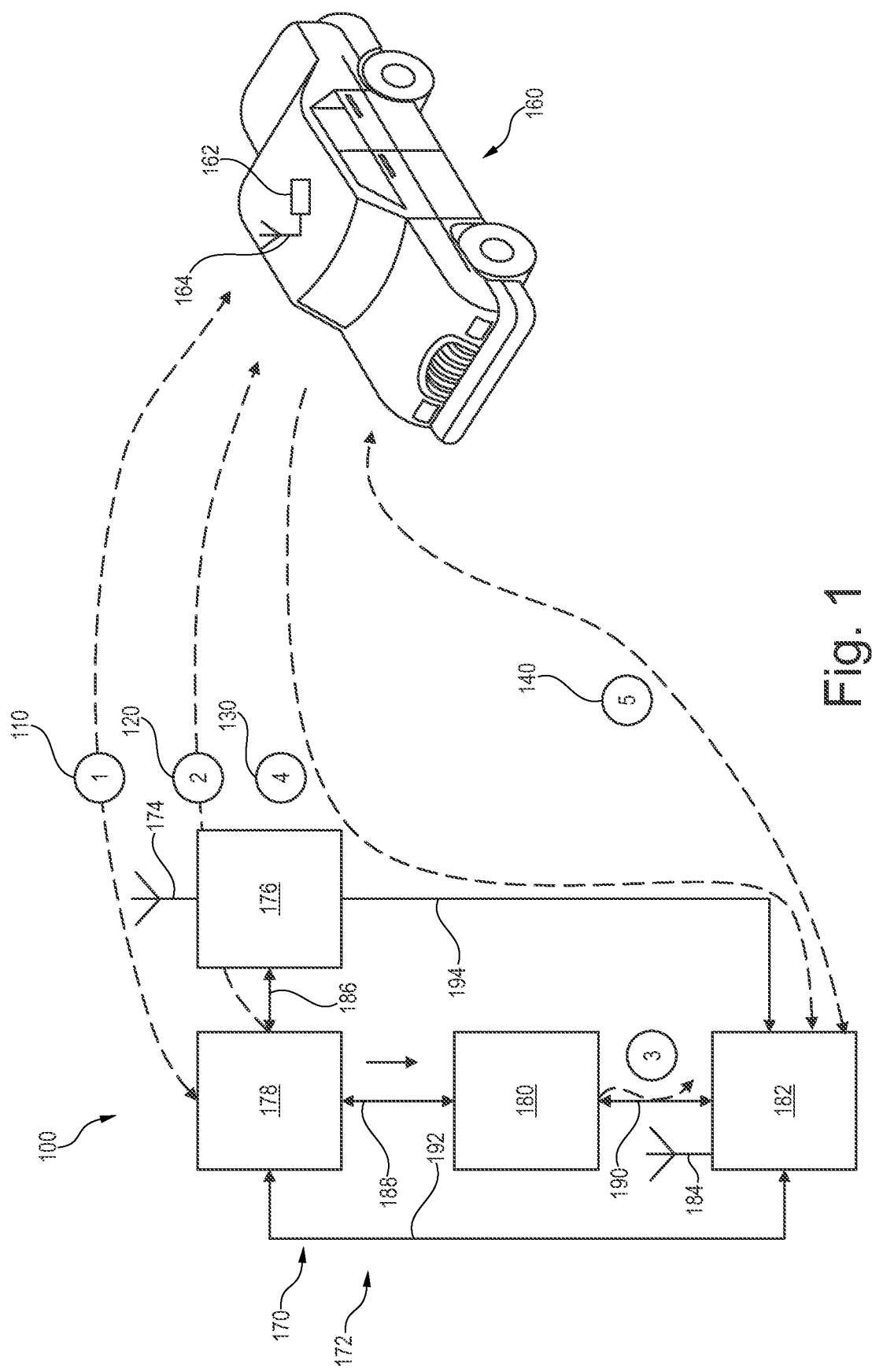
FIG. 1 illustrates a ranging session and the phases thereof performed in a passive keyless entry system according to an embodiment example of the disclosure.

Before exemplary embodiment examples of the disclosure are described with reference to the figures, some general aspects of the disclosure as proposed by the present inventors shall still be explained.

In an attempt to provide secure car access in modern keyless entry systems—while not all systems available on the market are really secure—radio frequency (RF) ranging systems are used to protect against presently known attacks, such as the so-called relay attack, and/or in principle possible attacks, such as the so-called preamble injection attack and the theoretically known, but not yet found in the field, cicada attack, which are known to be possible in ultra-wide band (UWB) RF ranging systems. Note that the cicada attack is only known from the literature: Marcin Poturalski et al.: "The Cicada Attack: Degradation and Denial of Service in IR Ranging", 2010 IEEE International Conference on Ultra-Wideband (ICUWB2010), 20 to 23 Sep. 2010, Ninjang (China), but not (at least not yet) known to be practiced in the field. Some keyless entry systems rely on a Received Signal Strength Indicator (RSSI) to estimate the range (or distance) of the tag from the car. An attacker can use amplifiers to relay a tag signal, so that the tag signal appears to be transmitted from close to the car.

An UWB RF ranging system typically employs the Time-of-Flight principle to determine the distance between the tag and the structure to be opened or markers on the structure. Usually, a transceiver's transmitter sends out a waveform, commonly a chirp or a pulse, which is either reflected by an object or retransmitted by a second transceiver. Based on the amount of time it takes for the reflection or retransmission to reach the originating transceiver's receiver, the distance between the objects can be calculated. The so determined range between the receiver and the transmitter is then used as a control point to enable access.

The aim of attackers in known attacks is to actively transmit a signal or a set of signals, which shall result in the devices involved on both sides, i.e. on the side of the tag (e.g. a key fob) and on the side of the structure to be opened (e.g. a car), to erroneously determine that the distance between the tag and the structure is shorter than it actually is, in particular shorter than the control point/distance for enabling access.

EP 3 255 851 A1 discloses a concept for protecting against replay of previously transmitted pulses, wherein each transmitted pulse is included (or provided with) a so-called Secure Training Sequence (STS), the content of which can be predicted only with the knowledge of some shared keys. The concept of STS can also be used in RF communication involving the transmission of data frames.

The concept of a "Secure Training Sequence" (STS) has been developed in the industry with participation of the Applicant under the stated denomination. This concept is meanwhile being considered, among others, by standardization organizations for the purposes of standardization, further refinements, and spreading of this technology. As such, this concept has become the subject of the IEEE 802.15.4z standard document under the denomination "Generic Scrambled Timestamp Sequence" (GSTS). The denomination "Secure Training Sequence" (STS) and the denomination "Generic Scrambled Timestamp Sequence" (GSTS) are used synonymously, or interchangeably, in this disclosure.

Again, an RF ranging system, which forms a part of a keyless entry system, employs the Time-of-Flight principle to determine the distance between two objects or markers on objects. In such a system, a transceiver's transmitter usually sends out a waveform, commonly a chirp or a pulse, which is either reflected by an object or retransmitted by a second transceiver. Based on the amount of time it takes for the reflection or retransmission to reach the originating transceiver's receiver, the distance between the objects can be calculated. The range between the receiver and the transmitter will then be used as a control point to enable access.

To protect against replay of previously transmitted pulses, as has been developed and disclosed earlier by the Applicant, within each packet there will be included a Secure Training Sequence (STS) as described in EP 3 255 851 A1, or synonymously a Generic Scrambled Timestamp Sequence (GSTS) as described in IEEE 802.15.4z, the content of which can be predicted only with the knowledge of some shared keys.

A described in US 2018/0275268 A1, the scheme involving a STS (or GSTS) entails the transfer of a STS index (herein also referred to as "cryptoID"), which should always increment at a given rate and will be used by the transmitter and the receiver for synchronization purpose.

As further described in US 2018/0275268 A1, the STS index must be transmitted to allow a receiver to synchronize on the transmitter and to correctly predict the STS sequence of the next frames. This will be done by transmitting a Type 1 frame, which is herein also referred to as a data frame 300 of a first type and which is illustrated schematically in FIG. 3, the relevant information of which is the current STS index value. The integrity and authenticity of this STS index must be protected to prevent reuse by an attacker. Its confidentiality needs to be protected to avoid privacy of user to be compromised by fingerprinting the STS index, which it uses. In view of the limited (energy) budget available in ultra-wideband RF communication as used in keyless entry systems, in a Type 1 frame, the energy is optimized for the detection of a secure preamble, which is done by minimizing the length of the payload so as to limit an impact on the STS link energy budget.

Moreover, it is also required to protect data transfer, namely in order to prevent timestamp manipulation, at the end of a ranging session, see FIG. 1 and the related description further below. This is done via Type 2 frames, which are herein also referred to as data frames 350 of a second type, and which is also illustrated schematically in FIG. 3. A Type 2 frame is used to transfer ranging measurements and other information, the length of which cannot be predicted. In view of the limited (energy) budget available in ultra-wideband RF communication as used in keyless entry systems, in a Type 2 frame, the energy is optimized for data transmission and error-free detection of the transmitted data.

The present disclosure proposes a key derivation scheme for generating, including encoding, Type 1 frames and Type 2 frames. Such key derivation scheme should allow:
   a receiver to receive a STS index and to check its authenticity and integrity,
   protect the confidentiality of the STS index,
   allow to generate the STS (or GSTS) once the receiver is synchronized to the STS index,
   allow to transfer payload, while protecting its confidentiality and authenticity, and
   protect the privacy of a user by ensuring that no fingerprint, e.g. incrementing counter, address, etc., are transferred in the clear, i.e. unencrypted.

All these features shall be supported with minimal overhead. Indeed, every additional byte will for example decrease the RF (energy) budget, which is available in ultra-wide band RF communication as used e.g. in keyless entry systems. In other words, the amount of transmitted data shall be minimized.

Figure 5:
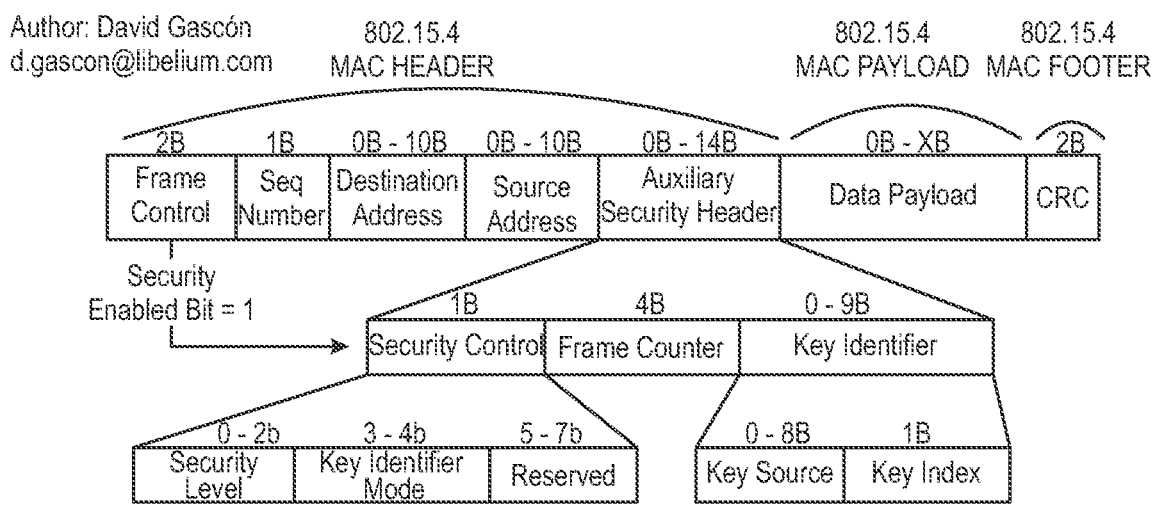
FIG. 5 illustrates schematically a conventional secured framing scheme of a MAC data frame according to the standard IEEE 802.15.4.

Most of the conventionally used secured data transmission schemes rely on the conventional framing and encryption concept as described in IEEE 802.15.4, which is well known to the skilled person, and which is illustrated schematically and only for illustrative reference in FIG. 5.

According to this conventional framing and encryption concept, data payload is encrypted, for example in the AES-CBC mode with a CBC-MAC, or in the AES-CCM mode. For both modes, a nonce (short for: number used only once) required by the encryption uses information, such as a source and a destination address as well as the frame counter.

One drawback of this concept is that it entails a large overhead due to the framing, and that all plaintext information can be used to track a user. Even if framing is optimized and fields are randomized, it is still required to transfer explicitly a nonce to allow the receiver to decrypt the message.

It is noted that conventionally proposed protection schemes already use different keys to:
   encrypt a Type 1 frame payload,
   generate the STS, and
   encrypt a Type 2 frame.

In order to protect against some types of attacks, such as e.g. a side channel attack against the system, the last two keys can be regularly recomputed based on the STS index, as both sides (transmitter and receiver) of the system will have their STS index synchronized when the transmitted messages are used.

The present disclosure aims to reduce the overhead of the conventional IEEE 802.15.4 framing scheme, while increasing the protection of the privacy of the user by encrypting the complete packets.

In order to achieve this, the presently proposed scheme is based on Electronic Code Book (ECB) encryption, or, when more data, e.g. more than one block (16 bytes or 128 bits) are to be transmitted, Cipher Block Chaining (CBC) encryption, of Frame Type 1 cyphertext, and is further based on authenticated encryption for Frames Type 2 with the STS index being used as a nonce for this authenticated encryption.

Figure 4:
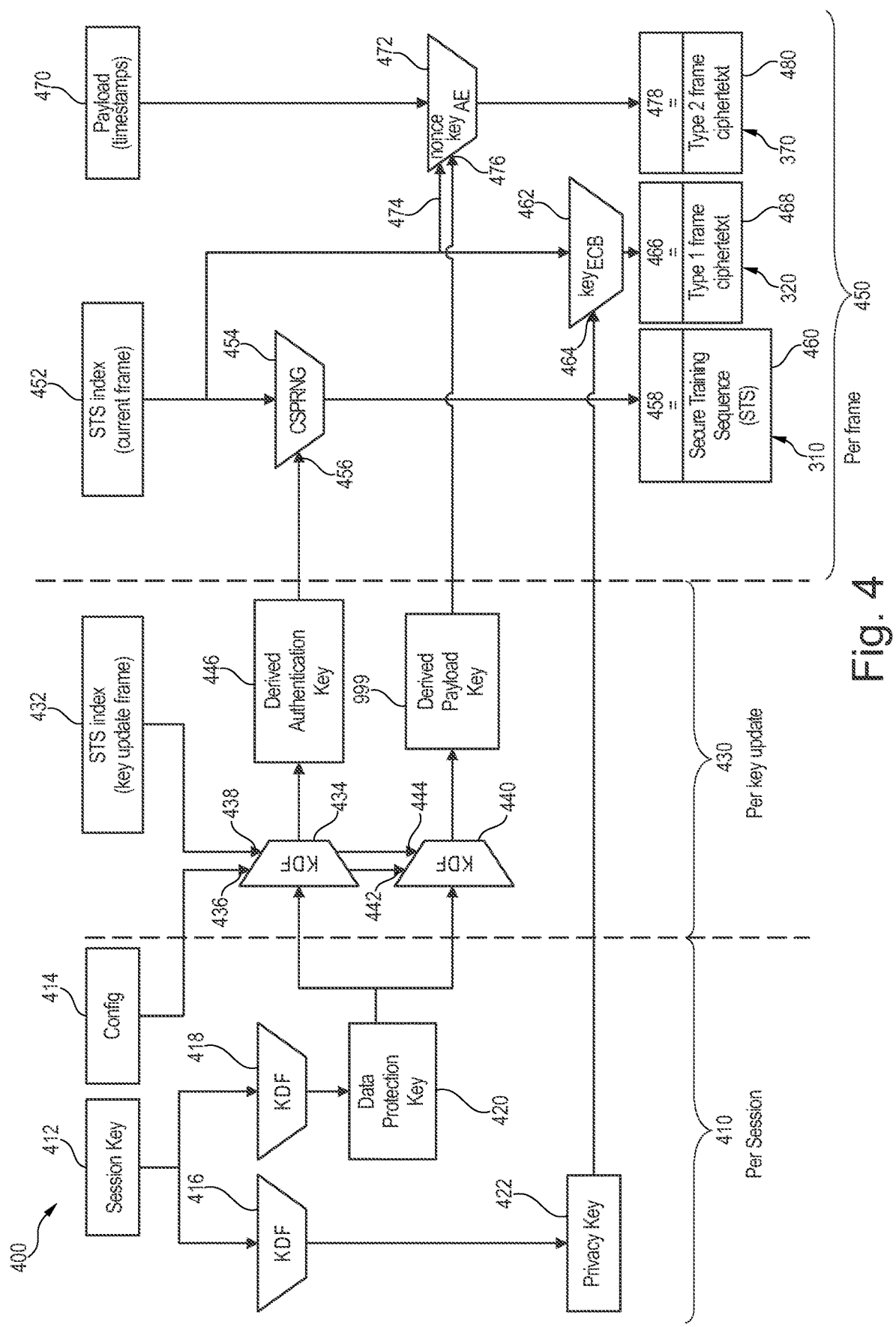
FIG. 4 shows a schematic block diagram of an overall key derivation scheme according to an embodiment example of the disclosure for the operations performed per ranging session, for the operations performed per key update step in the ranging session, and for the operations performed per frame transmission in the ranging session, in a passive keyless entry system.

In particular, in the present disclosure, the overall key derivation scheme as illustrated in FIG. 4 is proposed.

It can be seen in FIG. 4 that for Type 1 frames, the electronic code book (ECB) encryption mode is proposed to be used, at least for normal Type 1 frames. Generally speaking, the ECB mode is not such a good choice, because a same plaintext will result in a same ciphertext, but in this particular use case, because the STS index value is never repeated, there is no risk of generating a same ciphertext twice. In particular, the STS index is a nonce, which is modified before each next use. Incrementing a nonce before each next use is an easy and commonly used way to ensure the property that it is never repeated.

Also, ECB does not include a protection as to authenticity, but here proposal is that a Type 1 frame shall include:
- 32 bits STS index,
- 32 bits of ancillary data, e.g. source and destination address, and
- 64 bits of padding, e.g. 0x00..00.

Padding is used herein as an authenticity tag. This is possible, because if after decryption the ciphertext value is different from 0x00..00, then the ciphertext value cannot be trusted.

An advantage of the proposed key derivation and encoding scheme for Type 1 frames is that, on the receiver side, it is possible in one simple AES block decryption to get access to the STS index and the ancillary data and to check their integrity. There is no need to transmit any nonce, because the ECB encryption does not require one and because the property of the STS index, namely that an STS index value is not re-used within a (RF ranging or RF communication) session is used to avoid the ECB's otherwise known pitfalls.

For Type 2 frames, as there is no control over the plaintext data of the payload to be transmitted, according to the presently proposed scheme, it is recognized that it is important to ensure that two successive executions of the encryption will not result in a same encoding of the plaintext. In order to ensure this, an authenticated encryption is proposed to be used, wherein the nonce is the STS index (with some padding to reach 128 bits), as the STS index has the property of a nonce to be different for every frame.

As it is known and described in US 2018/0275268 A1, once the receiver is synchronized, the STS index does not need to be transmitted over the RF channel, which reduces the overhead. This will namely avoid the overhead of transmitting the nonce with the payload. The only remaining overhead to the framing and transmission of the payload will be that of the authentication tag.

For encrypting the payload, any encryption scheme with authentication, such as AES-CCM, can be used. However, AES-EAX as described in M. Bellare et al., "The EAX Mode of Operation", a full reference of which is provided above, is preferred, because the EAX mode allows to authenticate before decrypting and is simple to implement.

It can be seen in FIG. 4 and is pointed out here that multiple keys are used in the proposed key derivation scheme for each purpose:
- A privacy key 422 for the encryption (at 462 in FIG. 4) of a Type 1 frame to thereby obtain the Crypto ID as the ciphertext of a Type 1 frame.
- A payload key 448 for the encryption of the payload (at 472 in FIG. 4) of Type 2 frames to thereby obtain the ciphertext of a Type 2 frame. This one can be regularly updated, based on the STS index value, because Type 2 frames are only transmitted once the transmitter-receiver system is synchronized.
- An authentication key 446 for the encoding of the STS (or GSTS) (at 454). This one can be regularly updated, based on the STS index value as STS are checked on each transmission of a Type 1 frame.

Advantages of the presently proposed key derivation scheme can be seen in FIG. 4, and include that:

- No data or information in plaintext needs to be transferred.
- When the transmitter and the receiver devices are not synchronized, only 16 bytes need to be decrypted to transfer the STS index, while its confidentiality and authenticity is well protected.
- When the transmitter and the receiver devices are synchronized, the overhead of the authenticated encryption of the payload is limited to the handling of the authentication tag, which typically has only 64 bits.

FIG. 1 illustrates a ranging session 100 and the phases 110, 120, 130, 140 thereof performed in a keyless entry system according to an embodiment example of this disclosure. The keyless entry system comprises a base structure 160, which is to be opened and closed and/or to be locked and unlocked by the keyless entry system and which has at least one, and usually a plurality of structure-coupled transceivers 162 each coupled to an associated structure-coupled antenna 164, and at least one mobile device 170 or tag, which is associated with, and communicatively coupled to, the base structure 160. In the illustrated example, the base structure 160 is a car, which has a keyless entry system and comprises at least one anchor 162, and usually a plurality of anchors 162, which are located for example in four corners and near a roof of the car 160. The mobile device 170 is, in the example shown in FIG. 1, a mobile phone 172, which has a mobile transceiver 182 that is configured for ultra-wide RF communication in communicative coupling to the structure-coupled transceivers or anchors 162 and is coupled to an associated mobile antenna 184. Instead of a mobile phone, the mobile device 170 may also be a key fob 170 associated with the car 160. Data frames (or in other words data packets) 300, 350 can be transmitted, via an ultra-wide band RF channel, from the mobile transceiver 182 to the structure-coupled transceiver 162 and in the opposite transmission direction.

The mobile phone 172 is configured for use as a key fob in the keyless entry system of the car 160, and has a low energy transceiver 176, e.g. Bluetooth or WiFi, coupled to a low energy antenna 174 and configured to operate at a low power consumption, an application processor 178 operatively coupled to the low energy transceiver 176, a secure element (or a functional equivalent in terms of secure data storage) 180 for storing sensitive data, such as keys, and an ultra-wide band mobile transceiver 182 coupled to an associated mobile antenna 184. The low energy antenna 174 and the mobile antenna 184 may be implemented as, or incorporated in, a single multi-feed antenna device.

On the side of the mobile phone 172 acting as key fob (or generally as mobile device 170), the key fob system 178, 180, 182, which comprises the application processor 178, the secure element 180 and the mobile transceiver 182, is configured to implement and perform the proposed key derivation scheme according to this disclosure, namely the method for encoding data frames 300, 350 as disclosed herein.

On the side of the car representing the base structure 160 to be opened and closed and/or to be locked and unlocked, the base-structure coupled transceiver 162 is configured to implement and perform the proposed key derivation scheme according to this disclosure, namely the method for encoding data frames 300, 350 as disclosed herein.

The application processor 178, in co-operation with the secure element 180 and the mobile transceiver 182, operate at a relative high power consumption, and therefore may be switched into an idle state/idle states when their operation is temporarily not required. The low energy transceiver 176 may operate as a receiver for signals coming from the base structure 160 and as a wake-up device for the key fob system 178, 180, 182, via the signal line 186, when the key fob system 178, 180, 182 has been temporarily in an idle state.

When the application processor 178 has been woken up or is operative to perform the method for encoding data frames 300, 350 on the mobile phone 172, is configured to store in the secure element 180 and retrieve from the secure element 180, via the signal line 188, data and/or keys needed or involved in the method for encoding data frames 300, 350. The mobile transceiver 182 is also coupled to the secure element 180, via the data line 190, so as to be capable to also store in the secure element 180 and retrieve therefrom data and/or keys needed or involved in the method for encoding data frames 300, 350. The mobile transceiver 182 is coupled to the application processor 178 via the data line 192 so as to be capable to receive from, or to provide to, the application processor 178 data, including frames to be transmitted to, or received from, the structure-coupled transceiver 162. The mobile transceiver 182 is further configured to transmit to, and to receive from, the structure-coupled transceiver 162 data frames, including data frames 300 of the first type and data frames 350 of the second type, via an ultra-wide band RF communication channel.

A ranging session 100, in which mobile transceiver 182 and the structure-coupled transceiver 162 interact, for example to perform the RF ranging employing the Time-of-Flight principle, comprises a first phase 110 of initiating a ranging session 100, and further of configuring the ultra-wide band RF communication channel between, and agreeing the physical and initial cryptographic operating parameters among, the mobile transceiver 182 and the structure-coupled transceiver 162. A ranging session 100 may further comprises a subsequent second phase 120 of exchanging session keys, including upgrading encryption keys for establishing authenticity of the mobile transceiver device and confidentiality of data to be exchanged. On the side of the mobile device 170, here the mobile phone 172, when session keys and/or encryption keys are received, for example by the application processor 178, the latter may forward the session keys and/or encryption keys to the secure element 180 for secure storage. A ranging session 100 may further comprise a subsequent phase 130 of triggering a ranging sequence, which may be initiated from the side of the car 160 or from the side of the key fob or mobile phone 172. Thereafter, a ranging session 100 may comprise a subsequent phase 140 of performing ranging measurements, in which data frames 300 of the first type and notably data frames 350 of the second type are transmitted from the mobile transceiver 182 to the structure-coupled transceiver 162 and/or in the opposite transmission direction.

The mobile transceiver device 182 may be incorporated in a mobile phone 172 (such as a smart phone), which is arranged to be operable as a key fob device as mentioned above. Alternatively, for example, the mobile transceiver device 182 may be incorporated in a "mere" key fob device, which is arranged to control access to the base structure, and, as such, is devoid of the further functionalities and apps that a mobile phone is capable to provide to a user.

When the mobile transceiver device 182 is incorporated in a mobile phone 172, the mobile phone 172 may be capable to run multiple ranging sessions with multiple associated base structures 160, in particular cars, at a time. In reverse, the base structure 160, in particular a car, may be capable to run multiple ranging sessions with multiple associated mobile phones 172 at a time.

In respect of the method according to this disclosure, for encoding data frames 300, 350, a ranging session 100 comprises a first phase 110 of initiating a ranging session 100, e.g. "passively" by the mobile transceiver device 182 approaching the base structure 160, e.g. a car, for example due to the mobile device 170 being carried by a user approaching the base structure 160 (or actively by a user activating a button (not shown) provided on the mobile device 170), a second phase 120 of upgrading encryption keys for establishing authenticity of the mobile transceiver device and confidentiality of data to be exchanged, a third phase 130 of triggering a ranging measurement, and a fourth phase 140 of performing ranging measurements and transmitting data frames 300, 350 comprising payload data including timestamp and other measurement data.

It is noted that the data frames to be transmitted during a ranging session 100 may be sent from the mobile transceiver device 172 as a transmitting device to the structure-coupled transceiver device 162 as a receiving device. Alternatively, or in addition, the data frames to be transmitted may be sent in the opposite transmission direction, i.e. from the structure-coupled transceiver device 162 as a transmitting device to the mobile transceiver device 172 as a receiving device. In this respect it is noted that a round-trip time-of-flight measurement involves a bi-directional message (or signal) exchange.

Figure 2:
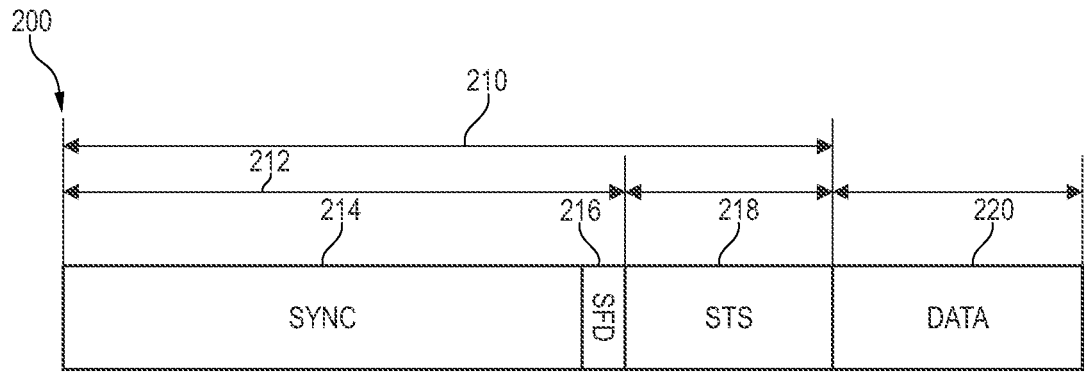
FIG. 2 shows a schematic block diagram of a secured data frame as conventionally transmitted in a ranging session of a passive keyless entry system.

FIG. 2 shows a schematic block diagram of a secured data frame 200 as conventionally transmitted in a ranging session 100 of a passive keyless entry system. The secured data frame 200 shown in FIG. 2 is in an implementation as in use since the introduction of the Generic Scrambled Timestamp Sequence (GSTS) or synonymously the Secure Training Sequence (STS), but before the introduction of Type 1 and Type 2 frames for improving use of the energy budget for frame transmission, and in line with the conventional IEEE 802.15.4 framing scheme.

The secured data frame 200 shown in FIG. 2 comprises a secure preamble 210 and a data portion 220. The secure preamble 210 has a synchronization header (SHR) 212, which in turn comprises a synchronization sequence (SYNC) 214 and a start frame delimiter 216, and a Secure Training Sequence (STS) 218, or synonymously a Generic Scrambled Timestamp Sequence (GSTS) 218. The data portion 220 has payload data, which in the case of a ranging system employed in a keyless entry system may comprise timestamp data and other measurement data.

On the one hand, it has been realized that when the data frame 200 is transmitted with the secure preamble 210 and the data portion 220, on the receiver side, the detection of the secure preamble 210 and the detection of the data portion 220 are independent from each other. Consequently, the secure preamble 210 can be detected, even the reception of (the data in) the data portion 220 fails, and the payload data in the data portion 220 can b received, even if the detection of the secure preamble 210 fails.

On the other hand, and in view of these afore-mentioned realizations, the data frame 200 having the secure preamble 210 and the data portion 220 is relatively long, so that with a limited (energy) budget of RF transmissions in the ultra-wide band the energy available for the secure preamble 210 and the energy available for the data portion 220 is sub-optimal.

These considerations lead to introducing a distinction between data frames optimized in terms of energy for transmitting the secure preamble, i.e. Type 1 data frames, or as denominated in the following, data frames 300 of the first type, and data frames optimized in terms of energy for transmitting the data portion, i.e. Type 2 data frames, or as denominated in the following, data frames 350 of the second type.

Figure 3:
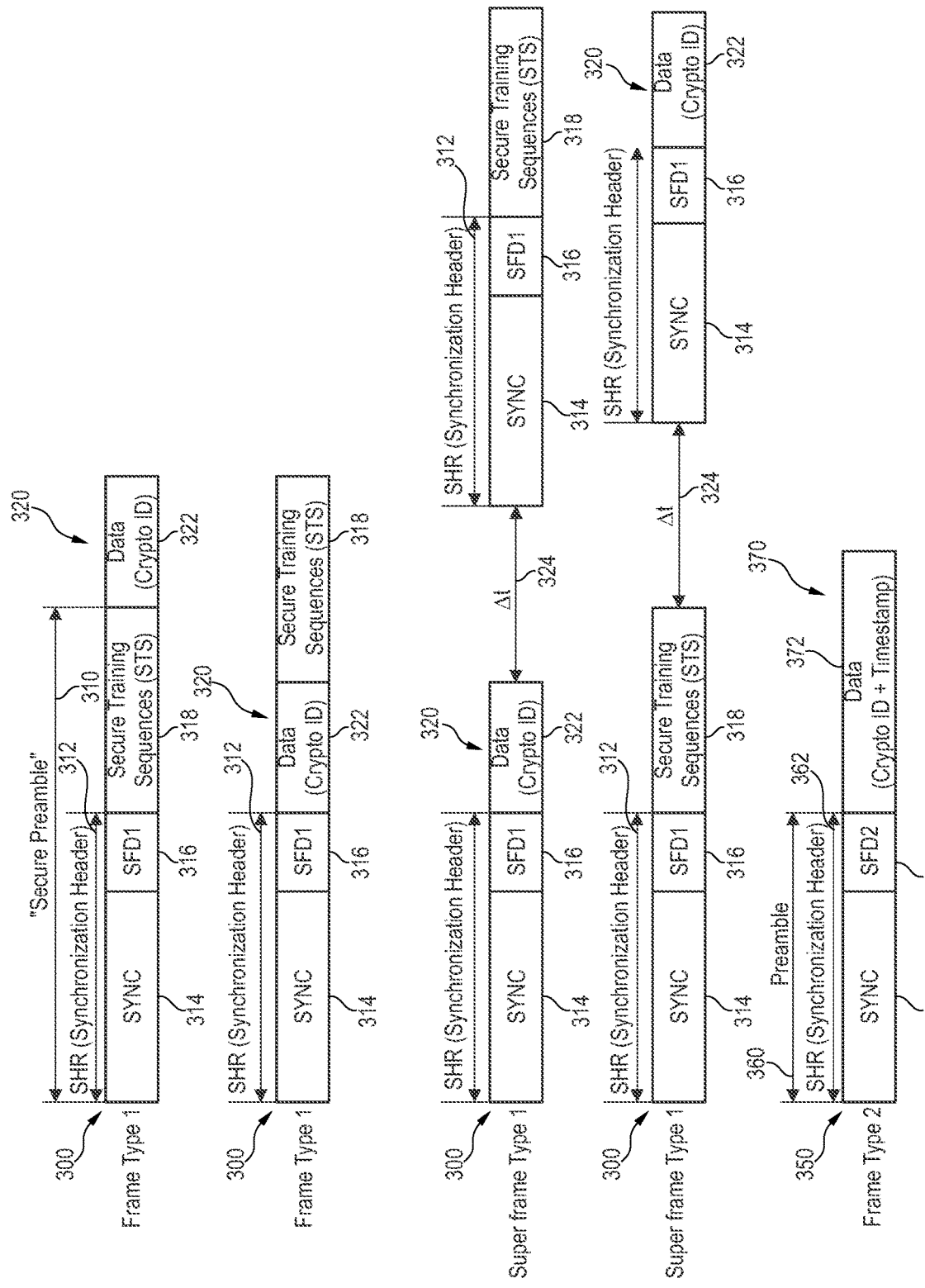
FIG. 3 shows schematic block diagrams of multiple embodiments of a secured data frame of a first type and an embodiment of a secured data frame of a second type, as transmitted in a ranging session of a passive keyless entry system, according to an embodiment example of the disclosure.

FIG. 3 shows schematic block diagrams of multiple embodiments of a secured data frame 300 of a first type and an embodiment of a secured data frame 350 of a second type, as they may be transmitted in a ranging session 100 of a passive keyless entry system, according to an embodiment example of this disclosure. The multiple embodiments of a secured data frame 300 of a first type are shown in the first to fourth row of FIG. 3. The embodiment of a secured data frame 350 of a second type is shown in the fifth, i.e. lowest, row of FIG. 3.

A data frame 300 of the first type may be implemented as a "compact" frame of the first type, which may be implemented according to one of the embodiments shown in the first and second rows of FIG. 3.

According to the embodiment shown in the first row of FIG. 3, the data frame 300 of the first type has, in the stated sequence, a secured preamble 310 comprising a synchronization portion 314, a first start frame delimiter 316, and the authenticated Generic Scrambled Timestamp Sequence 318, and further the data portion 320, which comprises, as part of its ciphertext, the crypto-identifier used once 322 (or "cryptoID"). The synchronization portion 314 and the first start frame delimiter 316 may in combination be referred to as a Synchronization Header 312.

According to the embodiment shown in the second row of FIG. 3, the data frame 300 of the first type has, in the stated sequence, a secured preamble 310 comprising a synchronization portion 314, a first start frame delimiter 316, and the data portion 320, which comprises, as part of its ciphertext, the crypto-identifier used once 322 (or "cryptoID), and furthermore the authenticated Generic Scrambled Timestamp Sequence 318. Again, the synchronization portion 314 and the first start frame delimiter 316 may in combination be referred to as a Synchronization Header 312.

Alternatively, a data frame 300 of the first type may be implemented as a "Superframe" of the first type, which may be implemented according to one of the embodiments shown in the third and fourth rows of FIG. 3.

According to the embodiment shown in the third row of FIG. 3, the data frame 300, or superframe, of the first type is composed of a first portion and a second portion. The first portion has a Synchronization Header 312, which comprises a synchronization portion 314 and a first start frame delimiter 316, and further has the data portion 320, which comprises, as part of its ciphertext, a crypto-identifier used once 322 (or "cryptoID"). The second portion also has a Synchronization Header 312, which comprises a synchronization portion 314 and a first start frame delimiter 316, and further has the authenticated Generic Scrambled Timestamp Sequence 318. In the superframe 300 of the first type, the second portion is delayed with respect to the first portion by a separation time period 324.

According to the embodiment shown in the fourth row of FIG. 3, the data frame 300, or superframe, of the first type has a first portion and a second portion, which are interchanged with respect to the first and second portion of the embodiment shown in the third row of FIG. 3. Namely, the data frame 300, or superframe, of the first type is composed of a first portion and a second portion. Herein, the first portion has a Synchronization Header 312, which comprises a synchronization portion 314 and a first start frame delimiter 316, and further has the authenticated Generic Scrambled Timestamp Sequence 318. The second portion has a Synchronization Header 312, which comprises a synchronization portion 314 and a first start frame delimiter 316, and further has the data portion 320, which comprises, as part of its ciphertext, a crypto-identifier used once 322 (or "cryptoID"). Also herein, the second portion is delayed with respect to the first portion by a separation time period 324.

A receiver can distinguish, whether it is receiving a data frame 300 of the first type or a data frame 350 of the second type by inspecting the start frame delimiter. A first start frame delimiter 316 is associated with, and is indicative of a data frame 300 of the first type, while a second start frame delimiter 366 is associated with, and is indicative of a data frame 350 of the second type.

FIG. 4 shows a schematic block diagram of an overall key derivation scheme 400 according to an embodiment example of this disclosure. The key derivation scheme is sub-divided (i) in key derivation during operations performed per ranging session 100 (commonly referenced with the reference numeral 410), in particular in the first phase 110 of initiating the ranging session 100, (ii) in key derivation during the operations performed per key update step in the ranging session 100 (commonly referenced with the reference numeral 430), in particular in the second phase 120 of upgrading encryption keys in the ranging session 100, and (iii) key derivation during the operations performed per frame transmission in the ranging session 100 (commonly referenced with the reference numeral 450), in particular in the third phase 140 of performing ranging measurements and transmitting timestamp and other measurement data.

As can be seen in FIG. 4 in the portion of key derivation per frame 450, different encoding and key derivation schemes are provided for a data frame 300 of a first type and for a data frame 350 of a second type.

Generally, and with reference to FIG. 3, a data frame 300 of the first type has at least one synchronization portion 314, at least one first start frame delimiter 316, an authenticated Generic Scrambled Timestamp Sequence 318, and a data portion 320, which comprises, as part of its ciphertext, a crypto-identifier used once 322 (or "cryptoID").

As is illustrated in an upper portion of FIG. 3, a data frame 300 of the first type may be implemented as a "compact" frame of Type 1, which has a secured preamble 310 comprising a synchronization portion 314, a first start frame delimiter 316, and an authenticated Generic Scrambled Timestamp Sequence 318, and a data portion 320, which comprises, as part of its ciphertext, a crypto-identifier used once 322.

Alternatively, and as is illustrated in a middle portion of FIG. 3, a data frame 300 of the first type may be implemented as a "Superframe" of Type 1, which has, as a first portion (not referenced), an authenticated Generic Scrambled Timestamp Sequence 318 preceded by a synchronization portion 314 and a first start frame delimiter 316, and which further has, as a second portion (not referenced), a data portion 320, which comprises, as part of its ciphertext, a crypto-identifier used once 322, and which is also preceded by the synchronization portion 314 and the first start frame delimiter 316, wherein the second portion (i.e. elements 314, 316, 322) is separated from the first portion (i.e. elements 314, 316, 318) by a separation time period 324.

Generally, and also with reference to FIG. 3, a data frame 350 of the second type has a preamble 360 and a data portion 370, wherein the preamble 360 comprises a synchronization portion 314 and a second start frame delimiter 366, and wherein the data portion 370 comprises unpredictably variable data contents 372.

The proposed method for encoding a data frame 300 of the first type is performed each time, when and before a data frame 300 of the first type is to be transmitted, that is in preparation of transmitting a particular data frame 300 of the first type.

With reference to the portion of key derivation per frame 450 indicated in FIG. 4, the proposed method for encoding a data frame 300 of the first type comprises providing a Secure Training Sequence index 452 (or: STS index, or synonymously: Generic Scrambled Timestamp Sequence index) for the current data frame 330 of the first type to be transmitted. The method further comprises providing an authentication key 446, which has been derived in the upgrading encryption keys phase 120 of the ranging session 100, or in other words among the key derivations performed per ranging session 100, which are commonly referenced in FIG. 4 with the reference numeral 410.

The method for encoding a Type 1 data frame 300 further comprises performing a cryptographically secure random number generation (CSPRNG) 454 taking the Generic Scrambled Timestamp Sequence index (or: STS index) 452 for the current data frame as its input and further using the derived authentication key 446 as its key input parameter 456, and provides an authenticated Generic Scrambled Timestamp Sequence 458, which will be incorporated in the secure preamble 310, 460 of the current data frame 300 of the first type to be transmitted.

Furthermore, the proposed method for encoding a Type 1 data frame 300 comprises performing an electronic code book (ECB) encryption 462, wherein the encryption takes the Generic Scrambled Timestamp Sequence index (or: STS index) 452 for the current data frame as its input and further uses a privacy key 464, which has been derived in the initiating phase 110, 410 of the ranging session 100, as its key input parameter 464, and provides the crypto-identifier used once 466 (or "cryptoID") for the ciphertext of the data portion 320, 468 of the current data frame of the first type to be transmitted.

While the ECB encryption mode is generally not well safe against attacks as it normally produces, for a repeated input, the same output, the presently proposed scheme relies on the property of the STS index, which is namely a monotonic counter that is changed after each single use or frame transmission, so that here the output will be different in each execution of the encryption 462. Moreover, the ECB encryption 462 is computationally relatively inexpensive and quick.

Alternatively to the ECB encryption 462, when more data, e.g. more than one block (16 bytes or 128 bits) are to be transmitted in the Type 1 data frame 300, the method may use Cipher Block Chaining (CBC) encryption, which is also computationally relatively inexpensive and quick.

With reference to the portion of key derivation per key update 430 indicated in FIG. 4, the authentication key 446 derived in the upgrading encryption keys phase 120 of the ranging session 100 (which is commonly referenced in FIG. 4 with the reference numeral 430) is obtained by applying a third key derivation function 434 to a data protection key 420, which is used for the third key derivation function 434 as its input, and which has been derived in initiating phase 110 of the ranging phase 100 (which is commonly referenced in FIG. 4 with the reference numeral 410). The third key derivation function 434 further uses a configuration information 414 for the ultra-wide band channel, which has been established in the initiating phase 110 of the ranging session 100, as its first derivation data input 436, and a Secure Training Sequence 432 for a key update frame, which has been provided in the upgrading encryption keys phase 120 of the ranging session 100, as its second derivation data input 438.

As can also be seen in FIG. 4 among the key derivations performed per key update 430, the payload key 448 derived in the upgrading encryption keys phase 120 of the ranging session 100 has been obtained by applying a fourth key derivation function 440 to a data protection key 420, which is used for the fourth key derivation function 440 as its input, and which has been derived in the initiating phase 110 of the ranging phase 100 (which is commonly referenced in FIG. 4 with the reference numeral 410). The fourth key derivation function 440 further uses a configuration information 414 for the ultra-wide band channel, which has been established in the initiating phase 110 of the ranging session 100, as its first derivation data input 442, and a Secure Training Sequence 432 for a key update frame, which has been provided in the upgrading encryption keys phase 120 of the ranging session 100 (which is commonly referenced in FIG. 4 with the reference numeral 430), as its second derivation data input 444.

The data protection key 420 derived in the initiating phase 110, 410 of the ranging session 100 has been obtained by applying a second key derivation function 418 to a session key 412, which has been provided in the initiating phase 110 of the ranging session 100 (or among the key derivations performed per session 410).

The privacy key 422 derived in the initiating phase 110, 410 of the ranging session 100 has been obtained by applying a first key derivation function 416 to a session key 412, which has been provided in the initiating phase 110, 410 of the ranging session 100.

The authenticated Generic Scrambled Timestamp Sequence index (or: STS index) 452 may be a seed for a crypo-identifier used once.

As has been discussed already above, the data portion 320 of the data frame 300 to be transmitted may comprise ciphertext of ancillary data including a source address of the transmitting device, in particular one of the mobile transceiver 182 and the structure-coupled transceiver 162, and a destination address of the receiving device, in particular one of and the structure-coupled transceiver 162 and the mobile transceiver 182, for example to an amount of 32 bits. In this embodiment, the data portion 320 further comprise padding bits, which are used as an authenticity tag, for example 0x00..00, for example to an amount, which results in the data portion 320 having the size of a cipher block, i.e. 128 bits. Padding may be used herein as an authenticity tag. This is possible, because if after decryption the ciphertext value is different from 0x00..00, then the ciphertext value cannot be trusted.

Again with reference to the portion of key derivation per frame 450 indicated in FIG. 4, the method for encoding a data frame 350 of the second type, is performed each time, when and before a data frame 350 of the second type is to be transmitted, that is in preparation of transmitting a particular current data frame 350 of the second type.

The proposed method for encoding a data frame 350 of the second type comprises providing payload data 470 to be transmitted, and providing the Generic Scrambled Timestamp Sequence (GSTS) index (or: STS index) 452 also for the current Type 2 data frame 350 to be transmitted. The method further comprises providing a payload key 448, which has been derived in the upgrading encryption keys phase 120 of the ranging session 100, or in other words among the key derivations performed in a key update phase 120 of the ranging session 100, which are commonly referenced in FIG. 4 with the reference numeral 430.

The method for encoding a Type 2 data frame 350 further comprises performing an authenticated encryption 472, which takes the payload data 470 for the current data frame as its input, and which further uses the Generic Scrambled Timestamp Sequence index (or: STS index) 452 for the current data frame as its nonce input parameter 474 and the derived payload key 448 as its key input parameter 476, and in result provides authenticated encrypted payload data 478 as the ciphertext of the data portion 370, 480 of the current data frame of the second type to be transmitted.

The authenticated encryption 472 may be implemented as one of: AES-CBC with a CBC-MAC, AES-CCM or AES-EAX. These implementations are computationally relatively inexpensive and quickly executable.

Supplementary, it is to be noted that "having" or "comprising" does not exclude other elements or steps, and that "a" or "an" does not exclude a plurality. In addition, it is to be noted that features or steps, which have been described above with reference to one of the above embodiment examples, may also be used in combination with other features or steps of other embodiment examples that have been described above. Reference numerals in the claims are not to be construed as limitations.

LIST OF REFERENCE NUMERALS 100 ranging session
110 initiating phase/channel configuration
120 upgrading encryption keys
130 triggering ranging measurements
140 performing ranging measurements
160 base structure
162 structure-coupled transceiver
164 structure-coupled antenna
170 mobile device
172 mobile phone
174 low energy antenna
176 low energy transceiver, e.g. Bluetooth or WiFi
178 application processor
180 secure element
182 mobile transceiver, e.g. ultra-wide band
184 mobile antenna
186 signal line
186 signal line
188 signal line
190 signal line
192 signal line
194 signal line
200 conventional UWB ranging data frame
210 secure preamble
212 synchronization header
214 synchronization sequence
216 start frame delimiter
218 Secure Training Sequence (STS) (or Generic Scrambled Timestamp Sequence (GSTS))
220 data portion
300 data frame of first type
310 secure preamble
312 synchronization header
314 synchronization sequence
316 first start frame delimiter
318 authenticated Secure Training Sequence (STS) (or Generic Scrambled Timestamp Sequence (GSTS))
320 data portion
322 crypto identifier used once
324 separation time period
350 data frame of second type
360 preamble
362 synchronization header
364 synchronization sequence
366 second start frame delimiter
370 data portion
372 crypto identifier used once and measurement data
400 overall key derivation scheme
410 key derivation in initiating phase
412 session key
414 configuration information
416 first key derivation function (KDF)
418 second key derivation function (KDF)
420 data protection key
422 privacy key
430 key derivation in upgrading encryption keys phase
432 Secure Training Sequence for key update frame
434 third key derivation function (KDF)
436 first derivation data input (KDF)
438 second derivation data input
440 fourth key derivation function
442 first derivation data input
444 second derivation data input
446 upgraded authentication key
448 upgraded payload key
450 key derivation in transmitting payload data frames phase
452 Secure Training Sequence (STS) for current frame
454 cryptographically secure pseudo-random generation (CSPRNG)
456 key input parameter
458 authenticated Secure Training Sequence (STS)
460 secure preamble
462 electronic code book (ECB) encryption
464 key input parameter
466 crypto identifier used once (CryptoID)
468 data portion
470 payload data (e.g. time stamp data)
472 authenticated encryption
474 nonce input parameter
476 key input parameter
478 authenticated encrypted payload data
480 data portion

The invention claimed is:

1. A method for encoding a data frame to be transmitted during a ranging session, in a keyless entry system comprising a transceiver device operatively coupled to a base structure to be opened and closed and/or to be locked and unlocked by the entry system and a mobile transceiver device provided to be approachable to the base structure and associated with a structure-coupled transceiver device, between the mobile transceiver device and the structure-coupled transceiver device, wherein the ranging session comprises a first phase of initiating the ranging session by operating the mobile transceiver device, a second phase of upgrading encryption keys for establishing authenticity of the mobile transceiver device and confidentiality of data to be exchanged, and a third phase of performing ranging measurements and transmitting data frames, and wherein the data frame to be transmitted is a data frame of a first type having at least one synchronization portion, at least one first start frame delimiter, an authenticated Generic Scrambled Timestamp Sequence, and a data portion, which comprises ciphertext having a crypto-identifier used once;

wherein the method for encoding the data frame of the first type, in preparation of the data frame transmission has:
providing a Generic Scrambled Timestamp Sequence index (or: STS index) for the data frame to be transmitted,
providing a derived authentication key, which has been derived in the second phase of upgrading encryption keys of the ranging session,
performing a cryptographically secure random number generation taking the Generic Scrambled Timestamp Sequence index for the data frame of the first type as an input and further using the derived authentication key as a key input parameter to provide the authenticated Generic Scrambled Timestamp Sequence for the data frame of the first type to be transmitted, and
performing an electronic code book, ECB, encryption, or a Cipher Block Chaining, CBC, encryption by taking the Generic Scrambled Timestamp Sequence index for the data frame of the first type as an input and further using a privacy key, which has been derived in the first phase of initiating the ranging session, as a key input parameter to provide the crypto-identifier used once for the ciphertext of the data portion of the data frame of the first type to be transmitted.

2. The method according to claim 1, wherein the derived authentication key derived in the second phase of upgrading encryption keys of the ranging session has been obtained by applying a third key derivation function to a data protection key, which is used for the third key derivation function as an input, and which has been derived in the first phase of initiating the ranging session, and which further uses a configuration information for an ultra-wide band channel, which has been established in the first phase of initiating the ranging session, as a first derivation data input, and a Secure Training Sequence for a key update frame, which has been provided in the second phase of upgrading encryption keys of the ranging session, as a second derivation data input.

3. The method according to claim 2, wherein the data protection key derived in the first phase of the ranging session has been obtained by applying a second key derivation function to a session key, which has been provided in the first phase of initiating the ranging session.

4. The method according to claim 1, wherein a payload key derived in the second phase of upgrading encryption keys of the ranging session is obtained by applying a fourth key derivation function to a data protection key, which is used for the fourth key derivation function as an input, and which has been derived in the first phase of initiating the ranging session, and which further uses a configuration information for an ultra-wide band channel, which has been established in the first phase of initiating the ranging session, as a first derivation data input, and a Secure Training Sequence for a key update frame, which has been provided in the second phase of upgrading encryption keys of the ranging session, as a second derivation data input.

5. The method according to claim 1, wherein the privacy key derived in the first phase of initiating the ranging session has been obtained by applying a first key derivation function to a session key, which has been provided in the first phase of initiating the ranging session.

6. The method according to claim 1, wherein the authenticated Generic Scrambled Timestamp Sequence index is a seed for a Generic Scrambled Timestamp Sequence.

7. The method according to claim 1,
wherein the data frames to be transmitted are sent from the mobile transceiver device as a transmitting device to the structure-coupled transceiver device as a receiving device, or
wherein the data frames to be transmitted are sent from the structure-coupled transceiver device as a transmitting device to the mobile transceiver device as a receiving device.

8. The method according to claim 7, wherein the data portion of the data frame to be transmitted comprises ciphertext of ancillary data comprising a source address of the transmitting device and a destination address of the receiving device,
wherein the data portion further comprises padding bits, which are used as an authenticity tag to an amount, which results in the data portion having the size of a cipher block.

9. The method according to claim 1, wherein the data frame of the first type is implemented according to one of the following embodiments:
i) the data frame of the first type has a secured preamble comprising a synchronization portion, a first start frame delimiter, the authenticated Generic Scrambled Timestamp Sequence, and the data portion, which comprises the ciphertext having the crypto-identifier used once;
ii) the data frame of the first type has the secured preamble comprising the synchronization portion, the first start frame delimiter, the data portion, which comprises the ciphertext having the crypto-identifier used once, and the authenticated Generic Scrambled Timestamp Sequence;
iii) the data frame of the first type is composed of a first portion and a second portion, wherein the first portion comprises a first synchronization portion, the first start frame delimiter, and the data portion, which comprises the ciphertext having a crypto-identifier used once, wherein the second portion comprises a second synchronization portion, a second start frame delimiter, and the authenticated Generic Scrambled Timestamp Sequence, and wherein the second portion is delayed with respect to the first portion by a separation time period;
iv) the data frame of the first type is composed of the first portion and the second portion, wherein the first portion comprises the first synchronization portion, the first start frame delimiter, and the authenticated Generic Scrambled Timestamp Sequence, wherein the second portion comprises the second synchronization portion, the second start frame delimiter, and the data portion, which comprises the ciphertext having a crypto-identifier used once, and wherein the second portion is delayed with respect to the first portion by a separation time period.

10. The method according to claim 1, wherein the keyless entry system is an ultra-wide band based keyless entry system.

11. The method of claim 1, wherein a range determined during the ranging session is used to enable access to the base structure.

12. A method for encoding a data frame to be transmitted during a ranging session, in a keyless entry system comprising a transceiver device operatively coupled to a base structure to be opened and closed and/or to be locked and unlocked by the entry system and a mobile transceiver device provided to be approachable to the base structure and associated with a structure-coupled transceiver device, between the mobile transceiver device and the structure-coupled transceiver device,

- wherein the ranging session comprises a first phase of initiating the ranging session by operating the mobile transceiver device, a second phase of upgrading encryption keys for establishing authenticity of the mobile transceiver device and confidentiality of data to be exchanged, and a third phase of performing ranging measurements and transmitting data frames;
- wherein the data frame to be transmitted is a data frame of a second type having a preamble and a data portion, wherein the preamble comprises a synchronization portion and a second start frame delimiter, and wherein the data portion comprises variable data contents;
- wherein the method for encoding a data frame of the second type, in preparation of the data frame transmission has:
  providing payload data to be transmitted,
  providing a Generic Scrambled Timestamp Sequence index (or: STS index) for the data frame to be transmitted,
  providing a payload key, which has been derived in the second phase of upgrading encryption keys of the ranging session, and
  performing an authenticated encryption taking the payload data for the data frame as an input and further using the Generic Scrambled Timestamp Sequence index for the data frame as a nonce input parameter and a derived payload key as a key input parameter to provide authenticated encrypted payload data as ciphertext of the data portion of the data frame of the second type to be transmitted.

13. The method according to claim 12, wherein the authenticated encryption is implemented as one of: AES-CBC with a CBC-MAC, AES-CCM, AES-GCM, or AES-EAX.

* * * * *